United States Patent
Moros et al.

(10) Patent No.: US 9,856,360 B2
(45) Date of Patent: Jan. 2, 2018

(54) COMPOSITION AND METHOD TO FORM A SELF DECONTAMINATING SURFACE

(71) Applicant: Allied Bioscience, Inc., Dallas, TX (US)

(72) Inventors: Daniel Moros, New York, NY (US); Craig Grossman, Point Roberts, WA (US); Gavri Grossman, Point Roberts, WA (US)

(73) Assignee: ALLIED BIOSCIENCE, INC., Dallas, TX (US)

(*) Notice: Subject to any disclaimer, the term of this patent is extended or adjusted under 35 U.S.C. 154(b) by 0 days.

(21) Appl. No.: 14/932,840

(22) Filed: Nov. 4, 2015

(65) Prior Publication Data
US 2016/0122587 A1    May 5, 2016

Related U.S. Application Data
(60) Provisional application No. 62/075,020, filed on Nov. 4, 2014.

(51) Int. Cl.
| | | |
|---|---|---|
| C08K 3/22 | (2006.01) | |
| C08G 77/62 | (2006.01) | |
| C09D 183/16 | (2006.01) | |
| C08G 73/02 | (2006.01) | |

(52) U.S. Cl.
CPC ............ *C08K 3/22* (2013.01); *C08G 73/0246* (2013.01); *C08G 77/62* (2013.01); *C09D 183/16* (2013.01); *C08K 2003/2241* (2013.01)

(58) Field of Classification Search
CPC ......... C08K 3/22; C08G 77/62; C09D 183/16
See application file for complete search history.

(56) References Cited

U.S. PATENT DOCUMENTS

| | | | |
|---|---|---|---|
| 3,068,199 A | 12/1962 | Sellers | |
| 3,133,108 A * | 5/1964 | Finestone | C07F 7/045 556/408 |
| 4,005,025 A | 1/1977 | Kinstedt | |
| 4,048,206 A | 9/1977 | Voronkov et al. | |
| 5,359,104 A | 10/1994 | Higgs et al. | |
| 5,879,436 A * | 3/1999 | Kramer | C08F 8/42 106/14.41 |
| 5,954,869 A | 9/1999 | Elfersy et al. | |
| 7,704,561 B2 | 4/2010 | Mehta et al. | |
| 2003/0101898 A1* | 6/2003 | Standke | C04B 24/42 106/14.41 |
| 2006/0142459 A1* | 6/2006 | Goebel | C08G 18/0823 524/444 |
| 2008/0131594 A1* | 6/2008 | Cho | C04B 41/009 427/140 |
| 2009/0030220 A1* | 1/2009 | Uchibori | B01D 53/26 556/51 |
| 2010/0029530 A1 | 2/2010 | Whiteley | |
| 2012/0015200 A1 | 1/2012 | Ali | |
| 2013/0040078 A1 | 2/2013 | Scharfe et al. | |
| 2013/0167754 A1 | 7/2013 | Wassmer | |
| 2014/0158018 A1 | 6/2014 | Geoffrion et al. | |
| 2015/0020712 A1* | 1/2015 | Wosylus | C09C 1/0021 106/457 |

FOREIGN PATENT DOCUMENTS

| | | |
|---|---|---|
| CN | 103305029 | 9/2013 |
| CN | 103351916 | * 10/2013 |
| JP | 06287068 | * 10/1994 |
| RU | 2450516 | * 5/2012 |
| SU | 1130570 | * 12/1984 |
| SU | 1567314 | * 5/1990 |
| WO | WO 2012142621 | 10/2012 |
| WO | 2013082096 A1 | 6/2013 |
| WO | WO 2014089560 | 6/2014 |

(Continued)

OTHER PUBLICATIONS

English language abstract, SU 1567314, May 1990.*
English language abstract, SU 1130570, Dec. 1984.*
Derwent Abstract 2014-A01672, corresponding to CN 103351916, Oct. 2013.*
Derwent Abstract 1994-363481, corresponding to JP 06287068, Oct. 1994.*
Derwent Abstract 2012-F82416, corresponding to RU 2450516, May 2012.*

(Continued)

*Primary Examiner* — Margaret G Moore
(74) *Attorney, Agent, or Firm* — Snell & Wilmer L.L.P.

(57) ABSTRACT

A polymeric material formed by reacting aminopolyol having a structure:

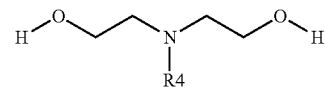

wherein R4 is selected from the group consisting of —H and —CH$_2$—CH$_2$—OH; and an organosilane, wherein said organosilane has a structure:

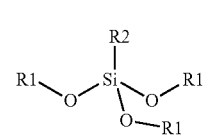

wherein R1 is selected from the group consisting of —H, —CH$_3$ and —CH$_2$—CH$_3$ and R2 is selected from the group consisting of —OH, —O—CH$_3$, O—CH$_2$—CH$_3$, alkyl, alkyl with a chlorine moiety, alkyl with an amino moiety, and alkyl with a quaternary ammonium group.

14 Claims, 10 Drawing Sheets

(56) References Cited

FOREIGN PATENT DOCUMENTS

WO    WO 2016073634    5/2016

OTHER PUBLICATIONS

WIPO: International Search Report and Written Opinion dated May 27, 2016 in Application No. PCT/US2016/017599.
International Search Report and Written Opinion dated Feb. 23, 2016 for PCT/US2015/059080.
Restriction Requirement dated May 25, 2017 in U.S. Appl. No. 15/041,974.
Moros, et al., U.S. Appl. No. 15/432,567, filed Feb. 14, 2017 and entitled "Synergistic Combinations of Choline and Reactive Silanes in Antimicrobial Coatings".
Moros, et al., U.S. Appl. No. 15/432,428, filed Feb. 14, 2017 and entitled "Methods of Preparing Reactive Mixtures of Silanes and Triethanolamine and Polymers Therefrom".
Moros, et al., U.S. Appl. No. 15/432,413, filed Feb. 14, 2017 and entitled "Methods of Preparing Self-Decontaminating Surfaces Using Reactive Silanes, Triethanolamine and Titanium Anatase Sol".
Moros, et al., U.S. Appl. No. 15/432,443, filed Feb. 14, 2017 and entitled "Antimicrobial Coatings Formed by Reaction of Silanes With Triethanolamine to Form Polymeric Siloxanes".
Office Action dated Apr. 3, 2017 in U.S. Appl. No. 15/432,567.

* cited by examiner

TABLE 9

| E. coli testing on Formica chips | | | | | |
|---|---|---|---|---|---|
| | 0 Hour | 2 Hour | Log Reduction 2 Hours | 6 Hour | Log Reduction 6 Hours |
| REVERSED ORDER OF COATING APPLICATION | 1,000,000 | 41,000 | 1.39 | 140 | 3.85 |
| Control | 1,000,000 | 800,000 | 0.10 | 37,000 | 1.43 |

FIG. 5

TABLE 10

| MS-2 testing on Formica chips | | | |
|---|---|---|---|
| | 0 Hour | 2 Hour | Log Reduction 2 Hours |
| REVERSED ORDER OF COATING APPLICATION | 1,000,000 | 16,000 | 3.12 |
| Control | 21,000,000 | 110,000 | 2.28 |

FIG. 6

TABLE 11

| MRSA testing on Formica chips | | | | | | | |
|---|---|---|---|---|---|---|---|
| | 0 Hour | 2 Hour | Log Reduction 2 Hours | 6 Hour | Log Reduction 6 Hours | 24 Hour | Log Reduction 24 Hours |
| REVERSED ORDER OF COATING APPLICATION | 3,700,000 | 51,000 | 1.86 | 18,000 | 2.31 | 1,200 | 3.49 |
| Control | 3,700,000 | 2,300,000 | 0.21 | 58,000 | 1.80 | 5,800 | 2.80 |

FIG. 7

TABLE 12

| E. coli testing on Formica chips | | | | | |
|---|---|---|---|---|---|
| | 0 Hour | 2 Hour | Log Reduction 2 Hours | 6 Hour | Log Reduction 6 Hours |
| SIMULTANEOUS APPLICATION | 1,000,000 | 42,000 | 1.38 | 110 | 3.96 |
| Control | 1,000,000 | 800,000 | 0.10 | 37,000 | 1.43 |

FIG. 8

TABLE 13

| MS-2 testing on Formica chips | | | |
|---|---|---|---|
| | 0 Hour | 2 Hour | Log Reduction 2 Hours |
| SIMULTANEOUS APPLICATION | 1,000,000 | 42,000 | 2.70 |
| Control | 21,000,000 | 110,000 | 2.28 |

FIG. 9

TABLE 14

| MRSA testing on Formica chips | | | | | | | |
|---|---|---|---|---|---|---|---|
| | 0 Hour | 2 Hour | Log Reduction 2 Hours | 6 Hour | Log Reduction 6 Hours | 24 Hour | Log Reduction 24 Hours |
| SIMULTANEOUS APPLICATION | 1,700,000 | 130,000 | 1.45 | 7,000 | 2.72 | 1,400 | 3.42 |
| Control | 3,700,000 | 2,300,000 | 0.21 | 58,000 | 1.80 | 5,800 | 2.80 |

FIG. 10

TABLE 21

CFU/mL

| | | Untreated | | ABS-G2015E - No TiO2 | | ABS-G2020E - No TiO2 | | ABS-G2030E - No TiO2 | |
|---|---|---|---|---|---|---|---|---|---|
| | | A | B | A | B | A | B | A | B |
| 0 hour | 1.E+04 | 1.36E+07 | 9.70E+06 | 5.20E+06 | 1.13E+07 | 1.50E+07 | 2.60E+07 | 6.20E+06 | 1.10E+07 |
| | 1.E+05 | 1.60E+07 | 9.00E+06 | 4.00E+06 | 2.00E+06 | 0.00E+00 | 2.00E+03 | 4.00E+06 | 0.00E+00 |
| 1 hour | 1.E+01 | | | | | 0.00E+00 | 0.00E+00 | 0.00E+00 | 0.00E+00 |
| | 1.E+02 | | | | | 0.00E+00 | 0.00E+00 | 0.00E+00 | 0.00E+00 |
| | 1.E+03 | | | | | 0.00E+00 | 0.00E+00 | 0.00E+00 | 0.00E+00 |
| | 1.E+04 | 1.30E+07 | 9.10E+06 | 1.90E+06 | 2.60E+06 | 0.00E+00 | 0.00E+00 | 0.00E+00 | 0.00E+00 |
| | 1.E+05 | | | | | 0.00E+00 | 0.00E+00 | 0.00E+00 | 0.00E+00 |
| 4 hour | 1.E+01 | | | 1.00E+02 | 3.00E+02 | 0.00E+00 | 1.00E+02 | 0.00E+00 | 0.00E+00 |
| | 1.E+02 | | | | 1.50E+04 | 0.00E+00 | 0.00E+00 | 0.00E+00 | 0.00E+00 |
| | 1.E+03 | 3.70E+06 | 3.40E+06 | | | 0.00E+00 | 0.00E+00 | 0.00E+00 | 0.00E+00 |
| | 1.E+04 | | | | | 0.00E+00 | 0.00E+00 | 0.00E+00 | 0.00E+00 |
| | 1.E+05 | | | | | 0.00E+00 | 0.00E+00 | 0.00E+00 | 0.00E+00 |

FIG. 11

TABLE 22

| Log Reduction | ABS-G2015E - No TiO2 | ABS-G2020E - No TiO2 | ABS-G2030E - No TiO2 |
|---|---|---|---|
| 0 hour | 0.33 | -0.23 | 0.23 |
| 1 hour | 0.69 | 4.74 | 7.04 |
| 4 hour | 2.84 | 5.55 | 6.55 |

FIG. 12

TABLE 23

| Percent Reduction | ABS-G2015H | ABS-G2020H | ABS-G2030H |
|---|---|---|---|
| 0 hour | 53.42% | -69.77% | 41.48% |
| 1 hour | 79.64% | 100.00% | 100.00% |
| 4 hour | 99.86% | 100.00% | 100.00% |

FIG. 13

COMPOSITION AND METHOD TO FORM A SELF DECONTAMINATING SURFACE

CROSS-REFERENCE TO RELATED APPLICATIONS

This Non-Provisional claims priority to U.S. Provisional Application having Ser. No. 62/075,020 filed Nov. 4, 2014, which is hereby incorporated by reference herein.

FIELD OF THE INVENTION

Embodiments generally relate a chemical composition and a method using that composition to form a self decontaminating surface. In certain embodiments, the chemical composition comprises a photocatalyst. In certain embodiments, the photocatalyst comprises a titanium oxide moiety. In certain embodiments, the chemical composition comprises an organosilane.

BACKGROUND OF THE INVENTION

In a publication entitled "Evaluation of Two Organosilane Products for Sustained Antimicrobial Activity on High-Touch Surfaces in Patient Rooms, American Journal of Infection Control 42 (2014) 326-8, reports, inter alia, "[t]o the best of our knowledge, ours is the first published controlled trial of applying organosilane compounds to high-touch surfaces in patient rooms as a strategy for reducing the level of microbial contamination of environmental surfaces between daily cleanings." Id. at 327.

The authors found the two organosilanes ineffective for any sort of sustained antimicrobial efficacy. "In conclusion, our study was not able to demonstrate sustained antimicrobial activity for either organosilane product tested when applied to high-touch surfaces." Id. at 328.

BRIEF DESCRIPTION OF THE DRAWINGS

The invention will be better understood from a reading of the following detailed description taken in conjunction with the drawings in which like reference designators are used to designate like elements, and in which:

FIG. 5 shows efficacy data for the treated coupons after inoculation with *E. coli*;

FIG. 6 shows efficacy data for the treated coupons after inoculation with MS-2;

FIG. 7 shows efficacy data for the treated coupons after inoculation with MRSA;

FIG. 8 shows efficacy data for the treated coupons after inoculation with *E. coli*;

FIG. 9 shows efficacy data for the treated coupons after inoculation with MS-2;

FIG. 10 shows efficacy data for the treated coupons after inoculation with MRSA;

FIG. 11 shows CFU/mL data for each of the three coating formulations, wherein each formulation did not include one or more titanium-oxide moieties;

FIG. 12 shows Log Reduction data for the three formulations evaluated, wherein each formulation did not include one or more titanium-oxide moieties; and FIG. 13 shows Percent Reduction data for the three formulations utilized, wherein each formulation did not include one or more titanium-oxide moieties.

DETAILED DESCRIPTION OF PREFERRED EMBODIMENTS

The invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In certain embodiments of Applicants' composition and method, a coating is formed on a surface of an object, where that coating comprises a plurality of titanium-oxygen bonds, where that coating is formed by disposing on the surface a mixture of Peroxotitanium acid solution and Peroxo-modified anatase sol (collectively "Titanium-Oxygen Moieties").

In certain embodiments, Applicants' Titanium-Oxygen Moieties comprises up to about a total of one weight percent loading of the mixture of Peroxotitanium acid solution and Peroxo-modified anatase sol. In certain embodiments, Applicants' Titanium-Oxygen Moieties comprises about 0.5 weight percent Peroxotitanium acid solution in combination with about 0.5 weight percent Peroxo-modified anatase sol.

Figure 4:
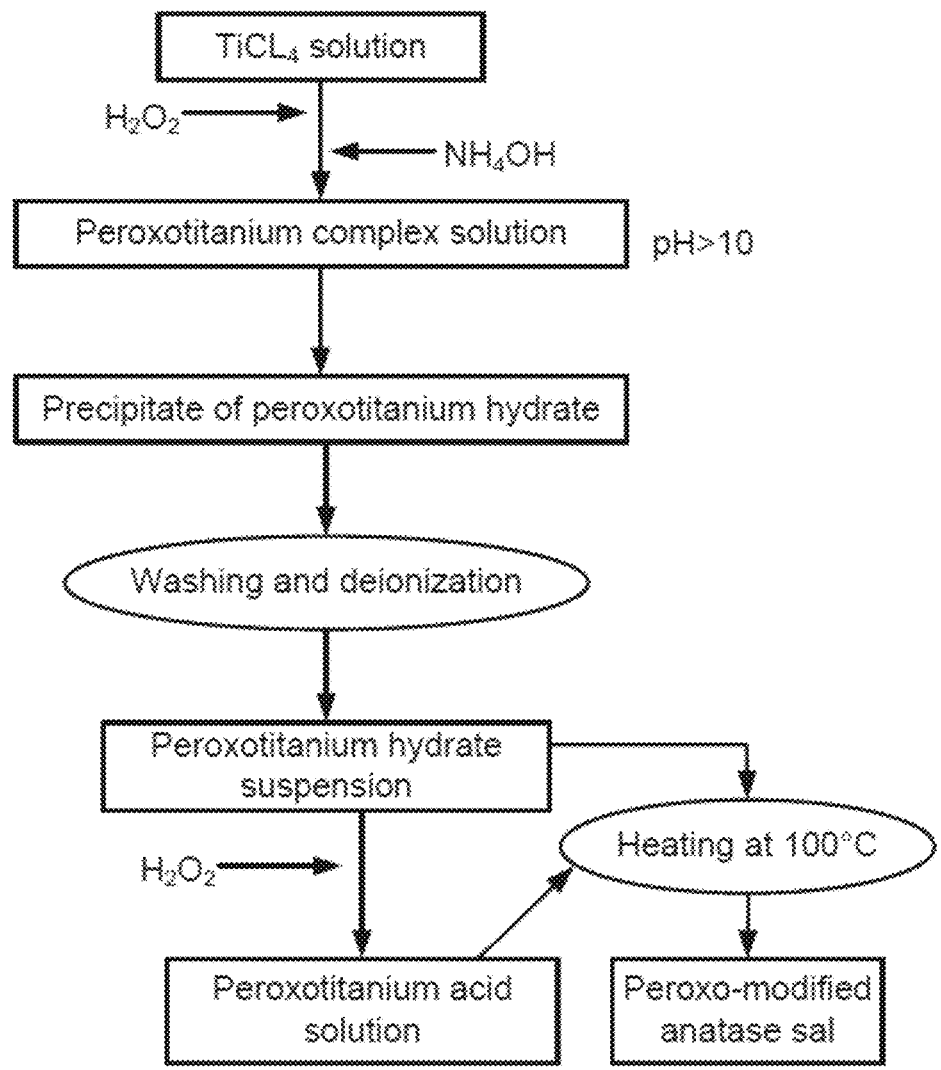
FIG. 4 shows a flowchart of a synthetic procedure for both Peroxotitanium acid solution and Peroxo-modified anatase sol.

A method to prepare both Peroxotitanium acid solution and Peroxo-modified anatase sol is disclosed in Journal of Sol-Gel Science and Technology, September 2001, Volume 22, Issue 1-2, pp 33-40. This publication discloses, inter alia, Reaction Scheme 1, shown in FIG. 4, which summarizes the synthetic procedure for both Peroxotitanium acid solution and Peroxo-modified anatase sol.

In one embodiment of Applicants' composition and method, Applicants' coating formulation comprises a mixture of Peroxotitanium acid solution and Peroxo-modified anatase sol. In another embodiment of Applicants' composition and method, a coating is formed on a surface of an object, where that coating comprises a plurality of titanium-oxygen bonds in combination with a plurality of silicon-oxygen bonds, and where that coating is formed by disposing a mixture of Peroxotitanium acid solution and Peroxo-modified anatase sol, in combination with an organosilane onto the surface.

In certain embodiments, a coating comprising a plurality of titanium-oxygen bonds in combination with a plurality of silicon-oxygen bonds is formed by first disposing on the surface an organosilane followed by disposing a mixture of Peroxotitanium acid solution and Peroxo-modified anatase sol onto the organosilane.

In certain embodiments, a coating comprising a plurality of titanium-oxygen bonds in combination with a plurality of silicon-oxygen bonds is formed by first disposing a mixture of Peroxotitanium acid solution and Peroxo-modified anatase sol on the surface followed by disposing an organosilane onto the mixture of Peroxotitanium acid solution and Peroxo-modified anatase sol. In certain embodiments, a coating comprising a plurality of titanium-oxygen bonds in combination with a plurality of silicon-oxygen bonds is formed by simultaneously disposing a mixture of Peroxotitanium acid solution and Peroxo-modified anatase sol and an organosilane onto the surface.

In certain embodiments, Applicants' organosilane comprises organosilane 1.

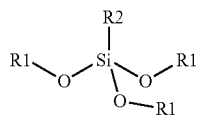

In certain embodiments, both R1 and R2 are alkyl. In other embodiments R1 is alkyl and R2 is alkyl with an amino moiety. In still other embodiments, R1 is alkyl and R2 comprises a quaternary ammonium group. In still other embodiments, R1 is alkyl and R2 comprises a chlorine moiety. In still other embodiments, R1 is alkyl and R2 is selected from the group consisting of —O—CH₃ and —O—CH₂—CH₃.

In certain embodiments, Applicants' organosilane comprises a trihydroxy silane 2. In certain embodiments, R2 is alkyl. In other embodiments R2 is alkyl with an amino moiety. In still other embodiments, R2 comprises a quaternary ammonium group. In still other embodiments, comprises a chlorine moiety. In still other embodiments, R2 is —OH.

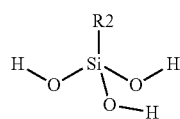

In certain embodiments, Applicants' organosilane comprises a silanetriol 2, wherein R2 is alkyl. In other embodiments, Applicants' organosilane comprises a silanetriol 2, wherein R2 is alkyl with an amino moiety. In still other embodiments, Applicants' organosilane comprises a silanetriol 2, wherein R2 is alkyl with a quaternary ammonium group.

As those skilled in the art will appreciate and as shown in Equation (1), silyl esters, such as silyl ester 1, are readily hydrolysable into a corresponding silanetriol, such as silanetriol 2. Even exposure to atmospheric moisture is sufficient to hydrolyze silyl ester 1 into silanetriol 2.

EQUATION (1)

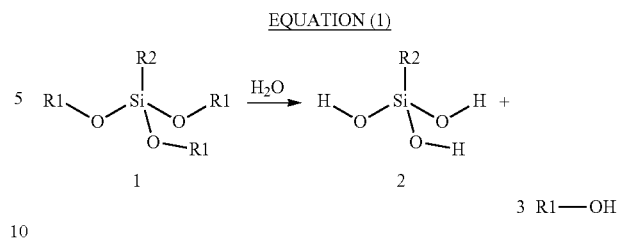

A silsesquioxane is an organosilicon compound 3. In certain embodiments, R2 is alkyl. In other embodiments, R2 is alkyl with an amino moiety. In yet other embodiments, R2 is alkyl with an chlorine moiety. In still other embodiments, R2 is alkyl with a quaternary ammonium group.

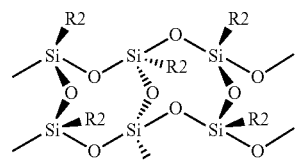

In certain embodiments, after application of Applicants' silanetriol 2 to either a hard surface, i.e. wall, door, table, and the like, or a soft surface, i.e. bedding, draperies, furniture cushions, and the like, a resulting coating disposed on the hard surface/soft surface comprises a plurality of silsesquioxane 3 structures. In certain embodiments, after application of Applicants' silanetriol 2 in combination with titanium dioxide to either a hard surface, i.e. wall, door, table, and the like, or a soft surface, i.e. bedding, draperies, furniture cushions, and the like, a resulting coating disposed on the hard surface/soft surface comprises a plurality of silsesquioxane structures 3 in combination with Applicants' Titanium-Oxygen Moieties.

The following Examples are presented to further illustrate to persons skilled in the art how to make and use the invention. These Examples are not intended as limitations, however, upon the scope of the invention.

Example I

A study was conducted at the Glendale Memorial Hospital and Health Center in Glendale, Calif. (the "Glendale Memorial Hospital Study"). The Center has a 24 bed intensive care (ICU). The study was performed between May 10 and Sep. 30, 2013.

The Glendale Memorial Hospital Study was designed to assess the anti-microbial properties of Applicants' coating composition and method, wherein the method employed utilized an initial coating of Applicants' organosilane followed by an overspray of titanium dioxide. The entire ICU was subjected to the two step spray regime to treat all objects in each room including hard surfaces (beds, tray tables, bed rail, walls, etc.) and soft surfaces (drapes, cloth and vinyl covered chairs, woven fabrics, non-woven fabrics, leather goods, and the like). The goal of the Glendale Memorial Hospital Study was to assess the anti-microbial efficacy of Applicants' coating composition in a practical application in a health care environment.

Each surface was first electrostatically spray coated at room temperature using an aqueous composition formed by mixing Octadecylaminodimethyltrihydrox-ysilylpropyl Ammonium Chloride 6 at 3.6 weight percent in water.

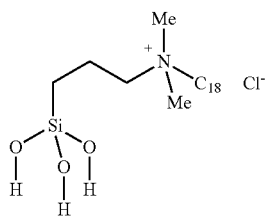

About fifteen (15) minutes after the electrostatic spray coating using the aqueous mixture of Octadecylaminodimethyltrihydroxysilylpropyl Ammonium Chloride 6, most of the water had evaporated leaving a coating comprising at least ninety weight percent (90 wt %) Octadecylaminodimethyltrihydroxysilylpropyl Ammonium Chloride 6. Thereafter, each surface was then electrostatically spray coated at room temperature using Applicants' Titanium-Oxide Moieties. After about 15 minutes, most of the water in the second spray deposition had evaporated leaving a coating comprising at least ninety weight percent (90 wt %) Applicants' Titanium-Oxide Moieties.

The treated surfaces were maintained at room temperature during the spray deposition of the aqueous Octadecylaminodimethyltrihydroxysilylpropyl Ammonium Chloride 6, and during the spray deposition of Applicants' Titanium-Oxide Moieties. None of the treated objects were subjected to any elevated heat treatment wherein the treated surface was heated to a temperature greater than about room temperature during or after completion of Applicants' spray coating regime.

Applicants have found that using their two step, spray coating protocol described hereinabove, after evaporation of the water from the spray deposited Titanium-Oxide Moieties and evaporation of the water portion from the spray deposited aqueous Octadecylaminodimethyltrihydroxysilylpropyl Ammonium Chloride, the combined weight of Applicants' Titanium-Oxide Moieties and Octadecylaminodimethyltrihydroxysilylpropyl Ammonium Chloride disposed on a treated surface was measured as 0.76 mg/in$^2$.

Initial microbial sampling of various fomites was conducted to assess the levels of bacteria on various hospital surfaces before selecting study sites. After review, 95 sites were selected for the study in the ICU. Each of the ninety-five (95) specific sites in the ICU were selected for recurring sampling at weeks 1, 2, 4, 8, and 15, after application of Applicants' composition. Those selected sites included bed rails, bed controls, tray tables, and walls above sinks. Samples were also collected from the two ICU nursing stations and waiting lobby including countertops, phones, computer keyboards, chair armrests and end tables. All movable items were inconspicuously tagged and coded over the course of the study so that the same objects could be sampled.

Each of the sites was cultured prior to application of Applicants' method and at 1 week (6-8 days), 2 weeks (13-17 days), 4 weeks (29-32 days), 8 weeks (59-62 days), 15 weeks (104-107 days) after application. Some objects were removed and were not available for culture at some of the subsequent time points.

Areas of 100 cm$^2$ were sampled using a sponge stick containing Letheen broth (3M, St. Paul, Minn.) to neutralize any residual disinfectant. After collection the samples were immediately placed on ice packs and sent overnight to the University of Arizona. Upon receipt the broth was extracted from the sponge stick by manual agitation, and then 4 mL of extracted broth was assayed using selective media for isolation of the various bacteria. Samples were cultured for total bacteria, *Clostridium difficile*, methicillin-resistant *Staphylococcus aureus* (MRSA), vancomycin resistant *enterococcus* (VRE), and carbapenemase resistant Enterobacteriaceae (CRE). Test methods for each organism are presented in Table 5.

TABLE 5

| Organism | Culture method | Incubation conditions | Further analysis |
|---|---|---|---|
| Total bacteria) | Spread plating on R2A medium (BD Diagnostics, Sparks, MD. | 24° C. for 5 days | |
| *C. difficile* | Incubation for 7 days in 0.1% sodium taurocholate and cycloserine-cefoxin fructose broth | Anaerobic conditions at 37° C. for up to 5 days | A 2-mL aliquot was mixed with equal amounts of absolute ethanol. Bacteria were concentrated by centrifugation and pellets were used to inoculate cycloserine-cefoxtin fructose agar. |
| MRSA | Trypticase soy agar amended with 5% sheep's bloods, 10 mg/L colistin, and 25 mg/ naladixic acid using spread plate method | 35° C. for 24-48 hours | B-hemolytic colonies were isolated and sub-cultured on trypticase case soy agar with no amendments and incubated at 35° C. for 24-48 hours. |
| CRE | Modified Hodge Test; Muller Hinton agar | 35° C./for 24 hours | |
| VRE | Bile esculin azide agar | 37° C. in CO$_2$ incubator for 24-48 hours | Gram stain, catalase test |

*from an original volume of 4 ml of sponge stick eluate. A 0.1 mL volume of this eluate was used for each assay.

The average number of total bacteria detected per 100 cm$^2$ at all locations and percent reductions in total bacterial numbers after treatment are shown in Table 6.

TABLE 6

Average (arithetic mean) total bacterial numbers (colony forming units) on 100 cm$^2$ from fomites and percent reduction after treatment

| | Baseline* | Weeks after treatment | | | | |
| | | 1 | 2 | 4 | 8 | 15 |
|---|---|---|---|---|---|---|
| Number of Samples | 95 | 81 | 64 | 64 | 64 | 45 |
| Avg number of bacteria | 233,064 | 98 | 80 | 43 | 2,247 | 3,320 |
| Range | 10-7,000,000 | 10-2,500 | 10-840 | 10-2,500 | 10-44,000 | 10-57,000 |
| % reduction | NA | 99.96 | 99.97 | 99.98 | 99.04 | 98.58 |

NA = not applicable,
*= before treatment

As can be seen bacterial numbers were always 99.9% less after the treatment for four weeks, 99% after eight weeks and still almost 99% after 15 weeks.

Also, significantly the number of sites containing more than 10,000 CFU/100 cm$^2$ was reduced from 71.5% of the sites before treatment to zero for the next eight weeks and after even 15 weeks only 11.1% of the sites exceeded this number as shown in Table 7.

TABLE 7

Percent colony forming units of total bacteria per 100 cm$^2$ exceeding value indicated

| | | Weeks after treatment | | | | |
|---|---|---|---|---|---|---|
| CFU | Baseline* | 1 | 2 | 4 | 8 | 15 |
| >100 | 71.5 | 11.1 | 17.2 | 12.8 | 51.2 | 33.3 |
| >1,000 | 51.5 | 2.4 | 1.5 | 0 | 17.1 | 24.4 |
| >10,000 | 25.2 | 0 | 0 | 0 | 4.6 | 11.1 |

*= before treatment

Bootstrapping Analysis of Variance (ANOVA) was conducted for each stage between the baseline concentrations for the sampled fomites and the intervention concentrations for the same fomites to determine statistical significant differences based on a rejection region of 5%. Based on the p-values (<0.0005) there was a statistical significance difference between the baseline concentrations and the fomite concentrations during the entire 15 weeks of the study.

The percent of samples in which antibiotic resistant bacteria were isolated at the different sites sampled is shown in Table 8.

TABLE 8

Isolation of aintibiotic resistant bacteria (percent of positive sites)

| | | Weeks after treatment | | | | |
|---|---|---|---|---|---|---|
| | Baseline* | 1 | 2 | 4 | 8 | 15 |
| Number of samples | 95 | 81 | 64 | 64 | 64 | 45 |
| VRE | 14 | 0 | 0 | 0 | 1 | 0 |
| MRSA | 7 | 0 | 0 | 0 | 0 | 0 |
| CRE | 3 | 0 | 0 | 0 | 0 | 0 |
| C. difficile | 0 | 0 | 0 | 0 | 0 | 0 |
| Overall Percentage | 25 | 0 | 0 | 0 | 1.5 | 0 |

*before treatment

Antibiotic resistant bacteria were isolated from all study areas during the baseline sampling, except *C. difficile*. VRE was the most commonly isolated organism.

Prior to treatment antibiotic resistant bacteria were isolated from 25% of the sites sampled. After treatment, no antibiotic bacteria were isolated until week 8, when VRE in 1 sample (from a chair armrest) of 64 samples (1.5%) was found.

The present study demonstrates that the use of Applicants' method reduced the numbers of bacteria on fomites by greater than 99% for 8 weeks after a single treatment (Table 6).

Levels of bacteria were reduced by 99.9% at 4 weeks post-treatment. Overall average levels of bacteria never returned to those observed before treatment. Bacterial numbers increased between 8 and 15 weeks post-treatment but the average bacterial count on all treated surfaces was still less than 90% after 15 weeks. No values above 10,000 CFU/100 cm$^2$ were seen for 4 weeks after treatment vs. 25.2% pre-treatment and even after 15 weeks only 11.1% of the values exceeded this amount.

No antibiotic resistant bacteria were isolated until 8 weeks after the treatment, and then at levels below that seen before the treatment (Table 8). No MRSA or CRE were isolated even after 15 weeks post-treatment and VRE only after 8 weeks. No *C. difficile* were isolated during the baseline or after the treatment. However, *C. difficile* was isolated in the initial screening used to select the sampling sites.

In conclusion, the anti-microbial effects resulting from use of Applicants' composition and method was found to have persisted over 15 weeks in reducing the total number of bacteria and antibiotic resistant bacteria on both hard surfaces and soft surfaces within an ICU. The hard surfaces included bare metal surfaces, painted metal surfaces, epoxy-coated surfaces, unpainted wood surfaces, painted wood surfaces, and glass.

The fifteen weeks antimicrobial efficacy demonstrates that Applicants' composition forms a coating on a treated surface, where that coating is both antifouling and antimicrobial. Applicants' composition and the resulting coating formed therefrom can generate self-decontaminating surfaces that comprise both antifouling and antimicrobial properties, thereby, providing a cost-effective route to minimize transmission of disease via high touch surfaces in healthcare and industrial applications.

Figure 1:
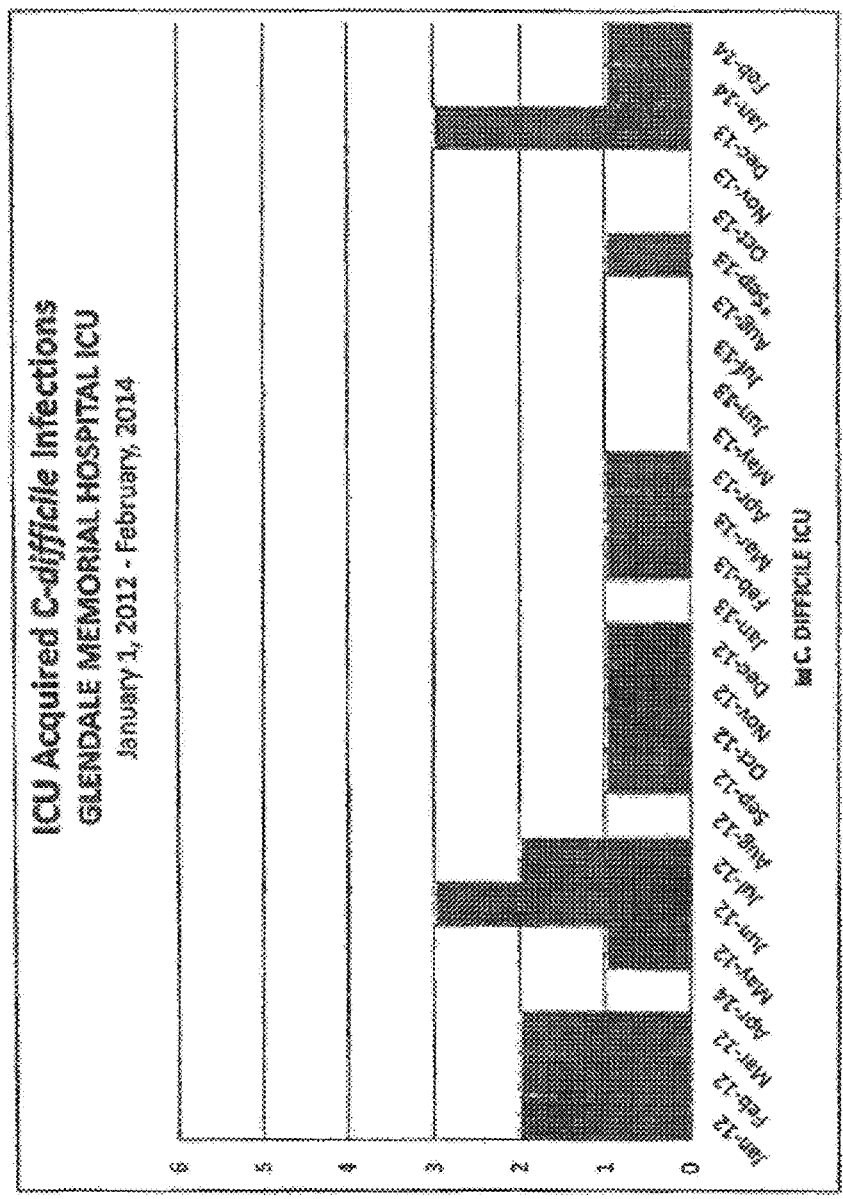
FIG. 1 graphically shows the number of hospital acquired *C-difficile* infections in the Glendale Memorial Hospital ICU from January 2012 through February 2014.

FIG. 1 graphically shows the number of hospital acquired *C-difficile* infections in the Glendale Memorial Hospital ICU from January 2012 through February 2014. FIG. 1 indicates that with the exception of September 2013, there were no hospital acquired *C-difficile* infections originating in the ICU during the period May 2013 through November 2013. Thus, FIG. 1 shows that there was a single hospital acquired *C-difficile* infection originating in the ICU during the six month period May 2013 through November 2013.

FIG. 1 further shows that, other than the six month period May 2013 through November 2013, there was no other 6 month period during the 25 months from January 2012 through February 2014 wherein only a single hospital acquired *C-difficile* infection originated in the ICU. All surfaces in the ICU were treated as described hereinabove during the first week of May 2013 as part of the Glendale Memorial Hospital Study.

Figure 2:
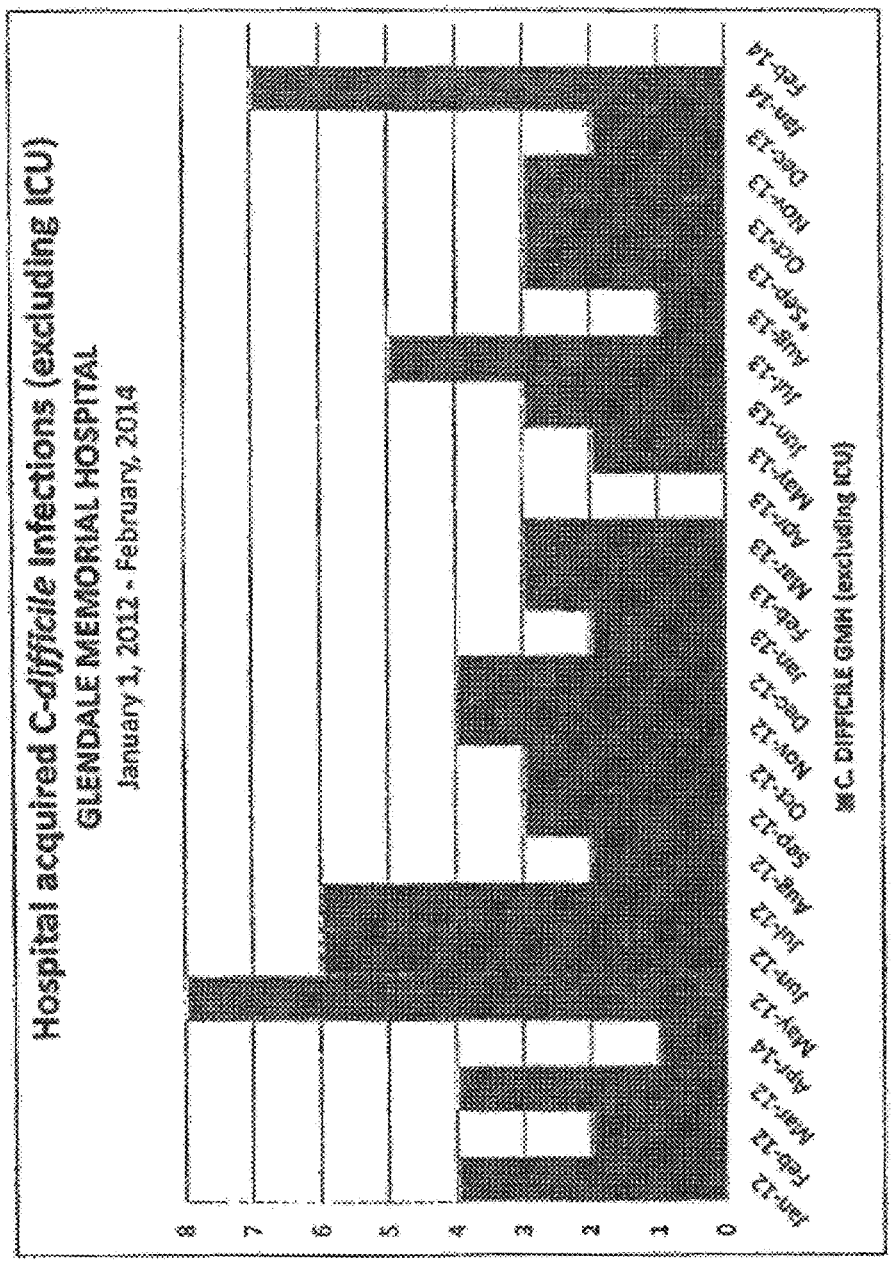
FIG. 2 graphically shows the number of hospital acquired *C-difficile* infections at the Glendale Memorial Hospital (excluding ICU) from January 2012 through February 2014.

FIG. 2 graphically shows the number of hospital acquired *C-difficile* infections at the Glendale Memorial Hospital (excluding ICU) from January 2012 through February 2014. FIG. 2 indicates that, with the exception of April 2013, there were between 1 and 8 hospital acquired *C-difficile* infections every month during the 25 month period in hospital areas outside of the ICU. During the period May 2013 through November 2013, FIG. 2 shows that there were a total of 20 hospital acquired *C-difficile* infections originating outside of the ICU at the Glendale Memorial Hospital.

FIGS. 1 and 2 show that during the period May 2013 through November 2013, a single hospital acquired *C-difficile* infection originated in the ICU at the Glendale Memorial Hospital, and a total of 20 hospital acquired *C-difficile* infections originated outside of the ICU at the Glendale Memorial Hospital.

Applicants have found that they can dispose Octadecylaminodimethyltrihydrox-ysilylpropyl Ammonium Chloride and Applicants Titanium-Oxide Moieties, by spray deposition or by dip coating, onto a dressing prior to use of that dressing to cover a wound. As those skilled in the art will appreciate, a dressing is a sterile pad or compress applied to a wound to promote healing and/or prevent further harm. A dressing is designed to be in direct contact with the wound, as distinguished from a bandage, which is most often used to hold a dressing in place. In certain embodiments, Applicants' wound dressings including the following: alginates and other fiber gelling dressings including ropes and sheets, composite dressings, foam dressings with and without adhesive border, gauze with and without adhesive border, hydrocolloids, specialty absorptive dressings with and without adhesive borders, transparent films, collagen dressings sheets and ropes, hydrogel sheets with and without adhesive border, cotton packing strips, roll gauze, paper tape, silk tape, compression bandages (elastic, knitted/woven), self-adherent bandage (elastic, non-knitted/non-woven).

Example II

This Example II disposes the components of Applicants' composition onto a target surface in a reverse order. More specifically in this Example II, Applicants' first dispose Applicants' Titanium-Oxide Moieties onto the target surface, the aqueous portion of the first spray deposition is evaporated, and then dispose Octadecylaminodimethyltrihydroxysilylpropyl Ammonium Chloride 6 over the earlier-disposed Titanium-Oxide Moieties.

The test coupons of this Example II were prepared and using the Procedure recited immediately hereinbelow. In certain embodiments, the treated coupons were stored for at least four (4) weeks prior to inoculation with various organisms.

FIG. 5 recites efficacy data for the treated coupons after inoculation with *E. coli*. FIG. 6 recites efficacy data for the treated coupons after inoculation with MS-2. FIG. 7 recites efficacy data for the treated coupons after inoculation with MRSA.

In summary, the tabular data set forth in FIGS. 5, 6 and 7 demonstrate that first disposing Applicants' Titanium-Oxide Moieties onto a target surface followed by disposing Octadecylaminodimethyltrihydroxysilylpropyl Ammonium Chloride 6 over the earlier-formed Titanium-Oxide Moieties coating, generates a self-decontaminating surface.

Procedure

Put on sterile gloves.
Prepare the test coupons by wiping them first with ISP Alcohol and allowing to dry.
Clean the test coupons with surface cleaner using a microfiber cloth.
Hold sprayer about eight (8) inches from surface to be cleaned.
Spray on let stand for 1-3 minutes and wipe it off, if the area is extremely dirty allow cleaner to stand longer, or apply a second spray and wipe.
Wipe surface with a clean, damp sponge or cloth.
Allow surface to completely dry.
With gloved hands examine coupons for consistency.

First Coat—Applicants' Titanium-Oxide Moieties Application

Add Applicants' Titanium-Oxide Moieties to the applicator container.
Fasten the Liquid Hose/Bottle cap assembly tightly on the container.
Connect the air hose from compressor to air fitting on the spray applicator.
Connect the liquid hose to the liquid fitting on the spray applicator.
Plug the power cord into an appropriate receptacle. Turn on the air compressor.
Optimal spraying distance is at least 36 to 48 inches away from the target surface.
Hold the spray gun at right angles to the target surface and spray.
Target surface should just barely glisten with the spray. Do not over-saturate the surface.
Rinse spray gun with distilled water prior to applying Applicants' Titanium-Oxide Moieties (unless using 2 sprayers, one for each product).

Second Coat—Organosilane Application

Add the Octadecylaminodimethyltrihydroxysilylpropyl Ammonium Chloride 6 to applicator container.
Fasten the Liquid Hose/Bottle cap assembly tightly on the container.
Connect the air hose from compressor to air fitting on the spray applicator.
Connect the liquid hose to the liquid fitting on the spray applicator.
Plug the power cord into an appropriate receptacle. Turn on the air compressor.
Optimal spraying distance is at least 36 to 48 inches away from the target surface.
Hold the spray gun at right angles to the target surface and spray.
Target surface should just barely glisten with the spray. Do not over-saturate the surface.
Allow surface to completely dry.
Clean the spray gun with distilled water per manufactures' specifications after each day of use.

Example III

This Example III simultaneously disposes a mixture of Applicants' organosilane and Applicants' Titanium-Oxide Moieties onto the surface of a plurality of test coupons. More specifically in this Example III, Applicants' simultaneously dispose Applicants' Titanium-Oxide Moieties and Octadecylaminodimethyltrihydroxysilylpropyl Ammonium Chloride 6 onto a surface of each test coupon.

The test coupons of this Example III were prepared and using the Procedure recited immediately hereinbelow. In certain embodiments, the treated coupons were stored for at least four (4) weeks prior to inoculation with various organisms.

FIG. 8 recites efficacy data for the treated coupons after inoculation with *E. coli*. FIG. 9 recites efficacy data for the treated coupons after inoculation with MS-2. FIG. 10 recites efficacy data for the treated coupons after inoculation with MRSA.

In summary, the tabular data set forth in FIGS. 8, 9 and 10 demonstrate that simultaneously disposing Applicants' Titanium-Oxygen Moieties and Applicants' organosilane onto a target surface generates a self-decontaminating surface.

Procedure

Put on sterile gloves.
Prepare the test coupons by wiping them first with ISP Alcohol and allowing to dry.
Clean the test coupons with surface cleaner using a microfiber cloth.
Hold sprayer about eight (8) inches from surface to be cleaned.

Spray on let stand for 1-3 minutes and wipe it off, if the area is extremely dirty allow cleaner to stand longer, or apply a second spray and wipe.

Wipe surface with a clean, damp sponge or cloth.

Allow surface to completely dry.

With gloved hands examine coupons for consistency.

Prepare Combined Solution

In a measured container combine 50% Octadecylaminodimethyltrihydroxysilylpropyl Ammonium Chloride aqueous mixture and 50% Applicants' Titanium-Oxide Moieties aqueous mixture.

Mix thoroughly.

Coating

Add the mixture from [00092] to applicator container.

Fasten the Liquid Hose/Bottle cap assembly tightly on the container.

Connect the air hose from compressor to air fitting on the spray applicator.

Connect the liquid hose to the liquid fitting on the spray applicator.

Plug the power cord into an appropriate receptacle. Turn on the air compressor.

Optimal spraying distance is at least 36 to 48 inches away from the target surface.

Hold the spray gun at right angles to the target surface and spray.

Target surface should just barely glisten with the spray. Do not over-saturate the surface.

Allow surface to completely dry.

Clean the spray gun with distilled water per manufactures' specifications after each day of use.

Example IV

This Example IV utilizes (3-Aminopropyl)trimethoxysilane in water as the only organosilane. This being the case, this Example VI utilizes NO organosilane(s) comprising a quaternary ammonium moiety. (3-Aminopropyl)trimethoxysilane is rapidly hydrolyzed to (3-Aminopropyl)trihydroxysilane) 7 when mixed with water.

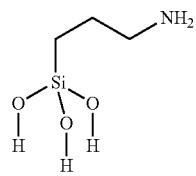

The test coupons of this Example IV were prepared and using the Procedure recited immediately hereinbelow. In certain embodiments, the treated coupons were stored for at least four (4) weeks prior to inoculation with various organisms.

Applicants have found that using their two step, spray coating protocol described hereinbelow, after evaporation of the water from the spray deposited Titanium-Oxide Moieties and evaporation of the water portion from the spray deposited aqueous (3-Aminopropyl)trihydroxysilane), the combined weight of Applicants' Titanium-Oxide Moieties and (3-Aminopropyl)trihydroxysilane) disposed on a treated surface was measured as 1.22 mg/in².

Applicants have found that they can dispose (3-Aminopropyl)trihydroxysilane and Applicants Titanium-Oxide Moieties, by spray deposition or by dip coating, onto a dressing prior to use of that dressing to cover a wound. As those skilled in the art will appreciate, a dressing is a sterile pad or compress applied to a wound to promote healing and/or prevent further harm. A dressing is designed to be in direct contact with the wound, as distinguished from a bandage, which is most often used to hold a dressing in place. In certain embodiments, Applicants' wound dressings including the following: alginates and other fiber gelling dressings including ropes and sheets, composite dressings, foam dressings with and without adhesive border, gauze with and without adhesive border, hydrocolloids, specialty absorptive dressings with and without adhesive borders, transparent films, collagen dressings sheets and ropes, hydrogel sheets with and without adhesive border, cotton packing strips, roll gauze, paper tape, silk tape, compression bandages (elastic, knitted/woven), self-adherent bandage (elastic, non-knitted/non-woven).

TABLES 15, 16, and 17, recite efficacy data for the treated coupons after inoculation with *E. coli*. In summary, TABLES 15, 16, and 17, demonstrate that disposing a 3-Aminopropyl)trihydroxysilane coating onto a target surface, and then disposing $TiO_2$ over that 3-Aminopropyl)trihydroxysilane coating generates a self-decontaminating surface.

Procedure

Put on sterile gloves.

Prepare the test coupons by wiping them first with ISP Alcohol and allowing to dry.

Clean the test coupons with surface cleaner using a microfiber cloth.

Hold sprayer about eight (8) inches from surface to be cleaned.

Spray on let stand for 1-3 minutes and wipe it off, if the area is extremely dirty allow cleaner to stand longer, or apply a second spray and wipe.

Wipe surface with a clean, damp sponge or cloth.

Allow surface to completely dry.

With gloved hands examine coupons for consistency.

Prepare Dilution for
(3-Aminopropyl)triethoxysilane

Prepare a 10% solution of 3-Aminopropyl)triethoxysilane in Methanol (MeOH) (10 ml silane in 100 ml MeOH).

Prepare Triethanolamine as a 10% solution in MeOH.

Combine the triethanolamine solution and 3-Aminopropyl)triethoxysilane solution in a 1:1 ratio on a stir plate at room temperature (ie-100 ml triethanolamine solution added to 100 ml 3-Aminopropyl)triethoxysilane solution.

First Coat—(3-Aminopropyl)triethoxysilane Application

Add the mixture from [000116] to the applicator container.

Fasten the Liquid Hose/Bottle cap assembly tightly on the container.

Connect the air hose from compressor to air fitting on the spray applicator.

Connect the liquid hose to the liquid fitting on the spray applicator.

Plug the power cord into an appropriate receptacle. Turn on the air compressor.

Optimal spraying distance is at least 36 to 48 inches away from the target surface.

Hold the spray gun at right angles to the target surface and spray.

Target surface should just barely glisten with the spray. Do not over-saturate the surface.

Rinse spray gun with distilled water prior to applying Applicants' Titanium Oxide Moieties (unless using 2 sprayers, one for each product).

Second Coat—Applicants' Titanium Oxide Moieties Application

Add Applicants' Titanium Oxide Moieties to the applicator container.

Fasten the Liquid Hose/Bottle cap assembly tightly on the container.

Connect the air hose from compressor to air fitting on the spray applicator.

Connect the liquid hose to the liquid fitting on the spray applicator.

Plug the power cord into an appropriate receptacle. Turn on the air compressor.

Optimal spraying distance is at least 36 to 48 inches away from the target surface.

Hold the spray gun at right angles to the target surface and spray.

Target surface should just barely glisten with the spray. Do not over-saturate the surface.

Allow surface to completely dry.

Clean the spray gun with distilled water per manufactures' specifications after each day of use.

TABLE 15

| Test Organism | Contact Time | Sample ID | Bacterial Counts (CFU/Carrier) | Mean Bacterial Count (CFU/Carrier) | $Log_{10}$ Reduction | Percent Reduction |
|---|---|---|---|---|---|---|
| E. coli 25922 | Time Zero | Control | 9.80E+06 <br> 8.65E+06 | 9.21E+06 | N.A. | |
| | | (3-Aminopropyl) triethoxysilane | 8.20E+06 <br> 7.90E+06 | 8.05E+06 | | |

TABLE 16

| | Contact Time | Sample ID | Bacterial Counts (CFU/Carrier)[a] | Mean Bacterial Count (CFU/Carrier) | $Log_{10}$ Reduction | Percent Reduction |
|---|---|---|---|---|---|---|
| E. coli 25922 | 1 Hour | Control | 3.35E+06 <br> 3.90E+06 | 3.16E+06 | N.A. | |
| | | (3-Aminopropyl) triethoxysilane | ≤5.00E+01 <br> ≤5.00E+01 | ≤5.00E+01 | ≥4.86 | ≥99.9986 |

[a]"≤": No bacterial colonies observed, therefore counts at or below limit of detection (based on 0.1 ml plating volume)

TABLE 17

| | Contact Time | Sample ID | Bacterial Counts (CFU/Carrier)[a] | Mean Bacterial Count (CFU/Carrier) | $Log_{10}$ Reduction | Percent Reduction |
|---|---|---|---|---|---|---|
| E.coli 25922 | 4 Hours | Control | 2.80E+05 <br> 5.45E+05 | 3.91E+05 | N.A. | |
| | | (3-Aminopropyl) triethoxysilane | ≤5.00E+01 <br> ≤5.00E+01 | ≤5.00E+01 | ≥3.89 | ≥99.987 |

[a]"≤": No bacterial colonies observed, therefore counts at or below limit of detection (based on 0.1 ml plating volume)

Example V

This Example V mixes (3-Chloropropyl)trimethoxysilane in water. (3-Chloropropyl)trimethoxysilane is immediately hydrolyzed to (3-Chloropropyl)trihydroxysilane 8 when mixed with water.

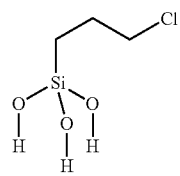

This being the case, this Example V utilizes NO organosilane(s) comprising a quaternary ammonium moiety. Furthermore, this Example VII utilizes NO organosilane(s) comprising an amino moiety.

The test coupons of this Example V were prepared using the Procedure recited immediately hereinbelow. In certain embodiments, the treated coupons were stored for at least four (4) weeks prior to inoculation with various organisms.

Applicants have found that they can dispose (3-Chloropropyl)trihydroxysilane and Applicants Titanium-Oxide Moieties, by spray deposition or by dip coating, onto a dressing prior to use of that dressing to cover a wound. As those skilled in the art will appreciate, a dressing is a sterile pad or compress applied to a wound to promote healing and/or prevent further harm. A dressing is designed to be in direct contact with the wound, as distinguished from a bandage, which is most often used to hold a dressing in place. In certain embodiments, Applicants' wound dressings including the following: alginates and other fiber gelling dressings including ropes and sheets, composite dressings, foam dressings with and without adhesive border, gauze with and without adhesive border, hydrocolloids, specialty absorptive dressings with and without adhesive borders, transparent films, collagen dressings sheets and ropes, hydrogel sheets with and without adhesive border, cotton packing strips, roll gauze, paper tape, silk tape, compression bandages (elastic, knitted/woven), self-adherent bandage (elastic, non-knitted/non-woven).

TABLES 18, 19, and 20, recite efficacy data for the treated coupons after inoculation with *E. coli*. In summary, TABLES 18, 19, and 20, demonstrates that disposing a (3-Chloropropyl)trihydroxysilane coating on a target surface followed by disposing Applicants' Titanium Oxide Moieties onto the (3-Chloropropyl)trihydroxysilane coating generates a self-decontaminating surface.

Procedure

Put on sterile gloves.

Prepare the test coupons by wiping them first with ISP Alcohol and allowing to dry.

Clean the test coupons with surface cleaner using a microfiber cloth.

Hold sprayer about eight (8) inches from surface to be cleaned.

Spray on let stand for 1-3 minutes and wipe it off, if the area is extremely dirty allow cleaner to stand longer, or apply a second spray and wipe.

Wipe surface with a clean, damp sponge or cloth.

Allow surface to completely dry.

With gloved hands examine coupons for consistency.

Prepare Organosilane Dilution for (3-Chloropropyl)trimethoxy silane

Prepare a 10% solution of (3-Chloropropyl)trimethoxy silane in Methanol (MeOH) (10 ml. silane in 100 ml. MeOH).

Prepare Triethanolamine solution as a 10% solution in MeOH.

Combine the triethanolamine solution and (3-Chloropropyl)trimethoxy silane solution in a 1:1 ratio on a stir plate at room temperature (ie-100 ml. trethanolamine added to 100 ml. (3-Chloropropyl)trimethoxy silane).

First Coat—(3-Chloropropyl)trimethoxy silane Application

Add the mixture of [000149] to the applicator container.

Fasten the Liquid Hose/Bottle cap assembly tightly on the container.

Connect the air hose from compressor to air fitting on the spray applicator.

Connect the liquid hose to the liquid fitting on the spray applicator.

Plug the power cord into an appropriate receptacle. Turn on the air compressor.

Optimal spraying distance is at least 36 to 48 inches away from the target surface.

Hold the spray gun at right angles to the target surface and spray.

Target surface should just barely glisten with the spray. Do not over-saturate the surface.

Rinse spray gun with distilled water prior to applying Applicants' Titanium Oxide Moieties (unless using 2 sprayers, one for each product).

Second Coat—Applicants' Titanium Oxide Moieties Application

Add Applicants' Titanium Oxide Moieties to the applicator container.

Fasten the Liquid Hose/Bottle cap assembly tightly on the container.

Connect the air hose from compressor to air fitting on the spray applicator.

Connect the liquid hose to the liquid fitting on the spray applicator.

Plug the power cord into an appropriate receptacle. Turn on the air compressor.

Optimal spraying distance is at least 36 to 48 inches away from the target surface.

Hold the spray gun at right angles to the target surface and spray.

Target surface should just barely glisten with the spray. Do not over-saturate the surface.

Allow surface to completely dry.

Clean the spray gun with distilled water per manufactures' specifications after each day of use.

TABLE 18

| Test Organism | Contact Time | Sample ID | Bacterial Counts (CFU/Carrier) | Mean Bacterial Count (CFU/Carrier) | Log$_{10}$ Reduction | Percent Reduction |
|---|---|---|---|---|---|---|
| E. coli 25922 | Time Zero | Control | 9.80E+06<br>8.65E+06 | 9.21E+06 | N.A. | |
| | | (3-Chloropropyl) trimethoxysilane | 1.16E+07<br>8.70E+06 | 1.00E+07 | −0.04 | −8.9% |

TABLE 19

| | Contact Time | Sample ID | Bacterial Counts (CFU/Carrier)$^a$ | Mean Bacterial Count (CFU/Carrier) | Log$_{10}$ Reduction | Percent Reduction |
|---|---|---|---|---|---|---|
| E. coli 25922 | 1 Hour | Control | 3.35E+06<br>3.90E+06 | 3.61E+06 | N.A. | |
| | | (3-Chloropropyl) trimethoxysilane | 1.10E+03<br>5.00E+01 | 2.35E+02 | 4.19 | 99.994% |

$^a$"≤": No bacterial colonies observed, therefore counts at or below limit of detection (based on 0.1 ml plating volume)

TABLE 20

| | Contact Time | Sample ID | Bacterial Counts (CFU/Carrier)$^a$ | Mean Bacterial Count (CFU/Carrier) | Log$_{10}$ Reduction | Percent Reduction |
|---|---|---|---|---|---|---|
| E. coli 25922 | 4 Hours | Control | 2.80E+05<br>5.45E+05 | 3.91E+05 | N.A. | |
| | | (3-Chloropropyl) trimethoxysilane | ≤5.00E+01<br>≤5.00E+01 | ≤5.00E+01 | ≥3.89 | ≥99.987 |

$^a$"≤": No bacterial colonies observed, therefore counts at or below limit of detection (based on 0.1 ml plating volume)

Example VI

This Example VI utilizes three (3) coating formulations without any Titanium-Oxide containing compounds. A first of the three coating formulations identified in this Example VI as ABS 2015E utilizes Octadecylaminodimethyltrihydroxysilylpropyl Ammonium Chloride 6 as the organosilane. A second of the three coating formulations identified in this Example VI as ABS 2020E utilizes (3-Aminopropyl) trihydroxysilane) 7 as the organosilane. A third of the three coating formulations identified in this Example VI as ABS 2030E utilizes (3-Chloropropyl)trihydroxysilane) 8 as the organosilane.

The method of Example IV as discussed above relating to spray deposition of a silane onto test coupons was utilized in this Example VI. The method in Example IV relating to spray deposition of the Titanium-Oxygen Moieties was not utilized in this Example VI.

FIG. 11 recites CFU/mL data for each of the three coating formulations, wherein each formulation did not include one or more titanium-oxide moieties. FIG. 12 recites Log Reduction data for the three formulations evaluated, wherein each formulation did not include one or more titanium-oxide moieties. FIG. 13 recites Percent Reduction data for the three formulations utilized, wherein each formulation did not include one or more titanium-oxide moieties.

In coating formulations ABS 2015E, 2020E, and 2030E, depending on the stoichiometry of the mixture of triethanolamine and the organosilane, one or polymeric species are formed on a treated surface. In certain embodiments, and as shown in Reaction Scheme 2, triethanolamine 9 and organosilane 1 react to form a linear polymer 10.

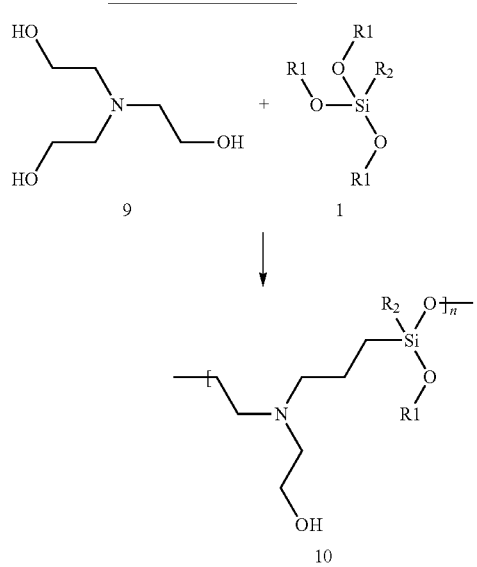

REACTION SCHEME 2

In other embodiments, and as shown in Reaction Scheme 3, triethanolamine 9 and organosilane 1 react to form a branched polymer 11.

REACTION SCHEME 3

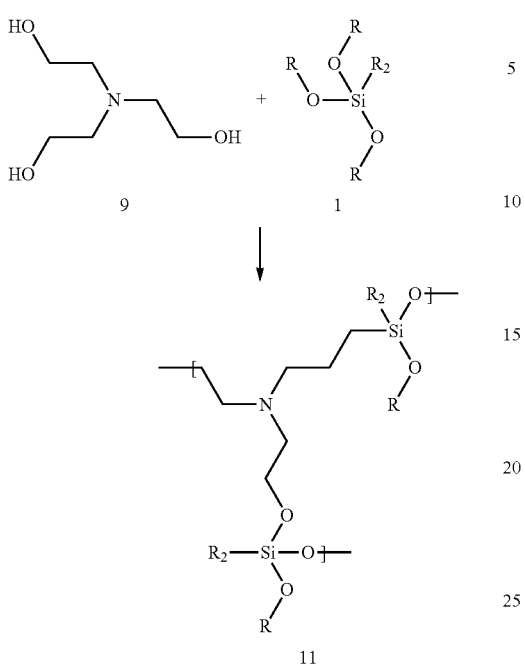

In other embodiments, and as shown in Reaction Scheme 4, triethanolamine 9 and organosilane 1 react to form a cross-linked polymer 12.

REACTION SCHEME 4 different polymer chains originating therefrom. Those skilled in the art will appreciate that Applicants' cross-linked polymer material 14 comprises a very high cross-link density.

REACTION SCHEME 5

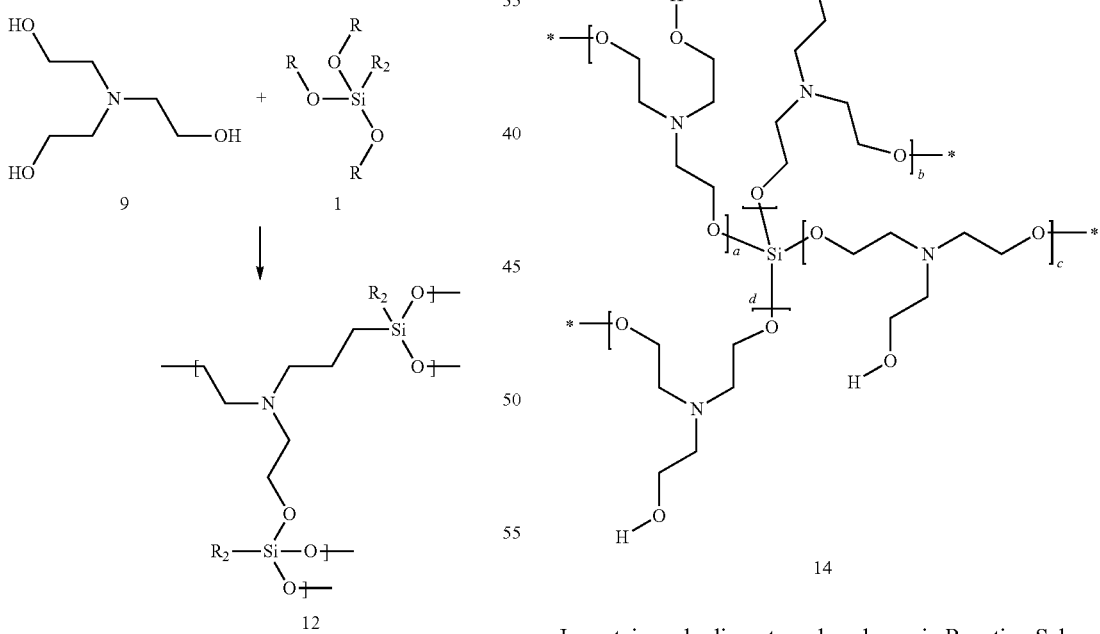

In certain embodiments, Applicants' organosilane comprises tetraethylorthosilicate 13. In certain embodiments and as shown in Reaction Scheme 5 and depending on the stoichiometry of the starting materials 9 and 13, Applicants cross-linked polymeric material 14 is formed by reaction of tetraethylorthosilicate 13 and triethanolamine 9. Reaction Scheme 5 illustrates a single Si atom having four (4) different polymer chains originating therefrom. Those skilled in the art will appreciate that Applicants' cross-linked polymer material 16 comprises a very high cross-link density.

In certain embodiments and as shown in Reaction Scheme 6 and depending on the stoichiometry of the starting materials 15 and 13, Applicants cross-linked polymeric material 16 is formed by reaction of tetraethylorthosilicate 13 and diethanolamine 13. Reaction Scheme 6 illustrates a single Si atom having four (4) different polymer chains originating therefrom. Those skilled in the art will appreciate that Applicants' cross-linked polymer material 16 comprises a very high cross-link density.

REACTION SCHEME 6

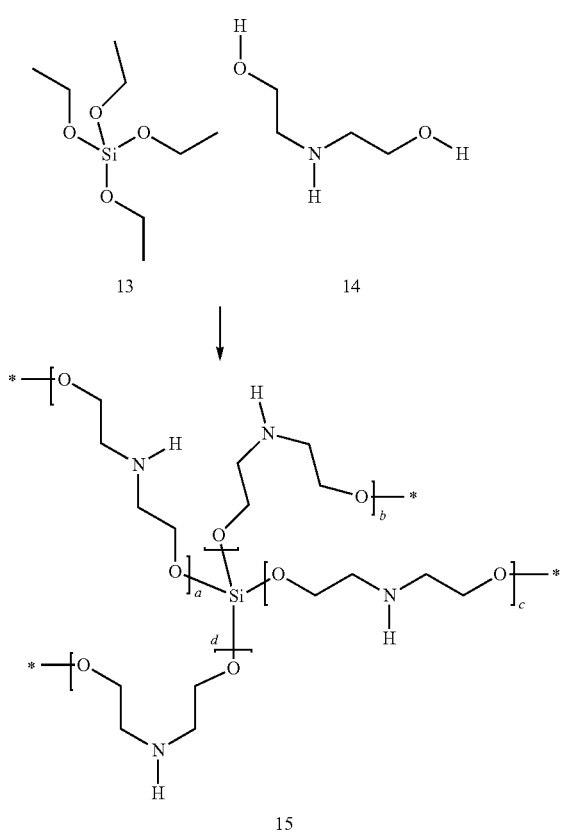

13    14

15

Example VII

Stainless steel carriers were coated with the solutions containing 7.5% of one of three different choline 16 compounds in $H_2O$, wherein R3 is selected from the group consisting of —H and —CO—$CH_3$. Cholines used included Choline Chloride, Choline Bitartrate, and Acetylcholine Chloride. Carriers were coated by dipping into solution using forceps and allowing to drip-dry overnight. Carriers were still not completely dry even after 24 hours drying time. Twenty (20) microliters of O/N cultures of *E. coli* 25592 (grown at 37 C for 18 hours) were added to each carrier. Following inoculation of the carriers, the carriers were swabbed with D/E neutralizing broth and processed for the zero hour time point. This was repeated for the 1and 4 hour time points.

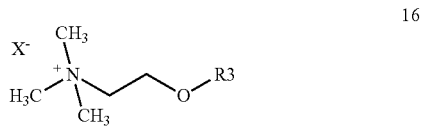

16

The collected samples were then diluted in PBS and 100 microliters were plated on to TSA plates and left overnight at 37° C. before counting and calculating cfu/ml. All carriers were tested in duplicate and two experiments were performed (A and B in data tables) in tandem. All data is represented as the mean+/−the SEM (standard error) when applicable.

When calculated relative to the timed control, choline bitartrate showed the greatest surface-kill, with a 2.39 log reduction in bacteria. Acetylcholine chloride and choline chloride showed a 1.85 and 1.40 log reduction, respectively. When compared with the results of aqueous solutions of Aminopropyl triethoxysilane (APTES) and the cholines at the same concentration, it is clear that these solutions are much more antimicrobial than the cholines on their own. APTES+Choline Chloride and APTES+Choline Bitartrate showed a 3.36 and 3.38 log reduction, respectively, at the 1 hour time point.

TABLE 24 recites antimicrobial efficacy data for the above-described choline formulations at time $T_0$, i.e. immediately after inoculation. TABLE 25 recites antimicrobial data at one (1) hour after inoculation.

TABLE 24

| Test Organism | Contact: Time | Sample ID | Cfu/mL | Mean Cfu/mL | Log$_{10}$ Reduction | Percent Reduction |
|---|---|---|---|---|---|---|
| *E. coli* | 0 hour | Control A | 2.50E+07 | 2.13E+07 | 0.00 | 0% |
| | | Control B | 1.75E+07 | | | |
| | | Choline Chloride A | 2.15E+07 | 2.58E+07 | −0.08 | −21% |
| | | Choline Chloride B | 3.00E+07 | | | |
| | | Choline Bitartrate A | 1.80E+07 | 1.40E+07 | 0.18 | 34% |
| | | Choline Bitartrate B | 1.00E+07 | | | |
| | | Acetylcholine Chloride A | 1.45E+07 | 1.20E+07 | 0.25 | 44% |
| | | Acetylcholine Chloride B | 9.50E+06 | | | |

TABLE 25

| Test Organism | Contact Time | Sample ID | Cfu/mL | Mean Cfu/mL | Log$_{10}$ Reduction | Percent Reduction |
|---|---|---|---|---|---|---|
| *E. coli* | 1 hour | Control A | 1.10E+07 | 7.40E+06 | 0.00 | 0% |
| | | Control B | 3.80E+06 | | | |
| | | Choline Chloride A | 7.38E+04 | 2.92E+05 | 1.40 | 96.06% |
| | | Choline Chloride B | 5.10E+05 | | | |
| | | Choline Bitartrate A | 5.75E+04 | 3.03E+04 | 2.39 | 99.59% |
| | | Choline Bitartrate B | 3.17E+03 | | | |
| | | Acetylcholine Chloride A | 1.44E+04 | 1.05E+05 | 1.85 | 98.59% |
| | | Acetylcholine Chloride B | 1.95E+05 | | | |

Stainless steel carriers were coated with solutions containing 7.5% of each choline compound and 5% Aminopropyltriethoxysilane in $H_2O$ (ABS-2040 contains choline chloride, while ABS-2041 contains choline bitartrate). Carriers were coated using an electrostatic sprayer and then allowed to dry. Carriers were still not completely dry even after 2 days of drying time. Twenty (20) microliters cultures of *E. coli* grown at 37° C. for 18 hours) were added to each carrier. Following inoculation of the carriers, the carriers were swabbed with neutralizing broth and processed for the zero hour time point. This was repeated for the 1 hour time point.

The collected samples were then diluted in PBS and 100 microliters were plated on to TSA plates and left 0/N at 37° C. before counting and calculating cfu/ml. All carriers were tested in duplicate and two experiments were performed (A and B in data table) in tandem. All data is represented as the mean+/−the SEM (standard error) when applicable. It is worth noting that colonies on the Choline Bitartrate plates were significantly smaller than the others.

Table 26 recites antimicrobial efficacy data at time $T_0$, i.e. immediately after inoculation. TABLE 27 recites antimicrobial data at one (1) hour after inoculation. TABLE 28 recites antimicrobial data at four (4) hours after inoculation.

Stainless steel carriers were coated with solutions containing 15% of each choline compound and 5% Aminopropyltriethoxysilane in H2O (ABS-2040 contains choline chloride, while ABS-2041 contains choline bitartrate). Carriers were coated using an electrostatic sprayer and then allowed to dry. Carriers were still not completely dry even after 2 days of drying time. 20 microliters of cultures of *E. coli* 25592 grown at 37° C. for 18 hours were added to each carrier. Following inoculation of the carriers, the carriers were swabbed with D/E neutralizing broth and processed for the zero hour time point. This was repeated for the 1 and 4 hour time points.

The collected samples were then diluted in PBS and 100 microliters were plated on to TSA plates and left 0/N at 37° C. before counting and calculating cfu/ml. All carriers were tested in duplicate and two experiments were performed (A and B in data table) in tandem. All data is represented as the mean+/−the SEM (standard error) when applicable.

Table 29 recites antimicrobial efficacy data at time $T_0$, i.e. immediately after inoculation. TABLE 30 recites antimicrobial data at one (1) hour after inoculation. TABLE 31 recites antimicrobial data at four (4) hours after inoculation.

TABLE 26

| Test Organism | Contact Time | Sample ID | Cfu/mL | Mean Cfu/mL | $Log_{10}$ Reduction | Percent Reduction |
|---|---|---|---|---|---|---|
| *E. coli* | 0 hour | Control A | 1.45E+07 | 1.34E+07 | 0.00 | 0% |
| | | Control B | 1.22E+07 | | | |
| | | ABS-2040 A | 1.05E+07 | 1.05E+07 | 0.10 | 21% |
| | | ABS-2040 B | 1.05E+07 | | | |
| | | ABS-2041 A | 1.10E+07 | 9.75E+06 | 0.14 | 27% |
| | | ABS-2041 B | 8.50E+06 | | | |

TABLE 27

| Test Organism | Contact Time | Sample ID | Cfu/mL | Mean Cfu/mL | $Log_{10}$ Reduction | Percent Reduction |
|---|---|---|---|---|---|---|
| *E. coli* | 1 hour | Control A | 7.70E+06 | 7.45E+06 | 0.00 | 0% |
| | | Control B | 7.20E+06 | | | |
| | | ABS-2040 A | 5.10E+03 | 3.28E+03 | 3.36 | 99.96% |
| | | ABS-2040 B | 1.45E+03 | | | |
| | | ABS-2041 A | 1.34E+03 | 3.13E+03 | 3.38 | 99.96% |
| | | ABS-2041 B | 4.91E+03 | | | |

TABLE 28

| Test Organism | Contact Time | Sample ID | Cfu/mL | Mean Cfu/mL | $Log_{10}$ Reduction | Percent Reduction |
|---|---|---|---|---|---|---|
| *E. coli* | 4 hour | Control A | 3.30E+06 | 3.95E+06 | 0.00 | 0% |
| | | Control B | 4.60E+06 | | | |
| | | ABS-2040 A | 1.00E+00 | 1.00E+00 | 6.60 | 99.999987% |
| | | ABS-2040 B | 1.00E+00 | | | |
| | | ABS-2041 A | 1.00E+00 | 1.00E+00 | 6.60 | 99.999987% |
| | | ABS-2041 B | 1.00E+00 | | | |

TABLE 29

| Test Organism | Contact Time | Sample ID | Cfu/mL | Mean Cfu/mL | Log$_{10}$ Reduction | Percent Reduction |
|---|---|---|---|---|---|---|
| E. coli | 0 hour | Control A | 1.35E+07 | 2.35E+07 | 0.00 | 0% |
| | | Control B | 3.35E+07 | | | |
| | | ABS-2040 A | 6.00E+06 | 6.75E+06 | 0.54 | 71% |
| | | ABS-2040 B | 7.50E+06 | | | |
| | | ABS-2041 A | 2.40E+06 | 1.32E+07 | 0.25 | 44% |
| | | ABS-2041 B | 2.40E+07 | | | |

TABLE 30

| Test Organism | Contact Time | Sample ID | Cfu/mL | Mean Cfu/mL | Log$_{10}$ Reduction | Percent Reduction |
|---|---|---|---|---|---|---|
| E. coli | 1 hour | Control A | 1.07E+07 | 1.30E+07 | 0.00 | 0% |
| | | Control B | 1.54E+07 | | | |
| | | ABS-2040 A | 1.00E+02 | 6.13E+03 | 3.33 | 99.95% |
| | | ABS-2040 B | 1.22E+04 | | | |
| | | ABS-2041 A | 5.00E+02 | 2.80E+04 | 2.67 | 99.8% |
| | | ABS-2041 B | 5.56E+04 | | | |

TABLE 31

| Test Organism | Contact Time | Sample ID | Cfu/mL | Mean Cfu/mL | Log$_{10}$ Reduction | Percent Reduction |
|---|---|---|---|---|---|---|
| E. coli | 4 hour | Control A | 4.30E+06 | 4.00E+06 | 0.00 | 0% |
| | | Control B | 3.70E+06 | | | |
| | | ABS-2040 A | 1.00E+00 | 2.55E+01 | 5.20 | 99.9998% |
| | | ABS-2040 B | 5.00E+01 | | | |
| | | ABS-2041 A | 1.00E+00 | 2.55E+01 | 5.20 | 99.9998% |
| | | ABS-2041 B | 5.00E+01 | | | |

Figure 3:
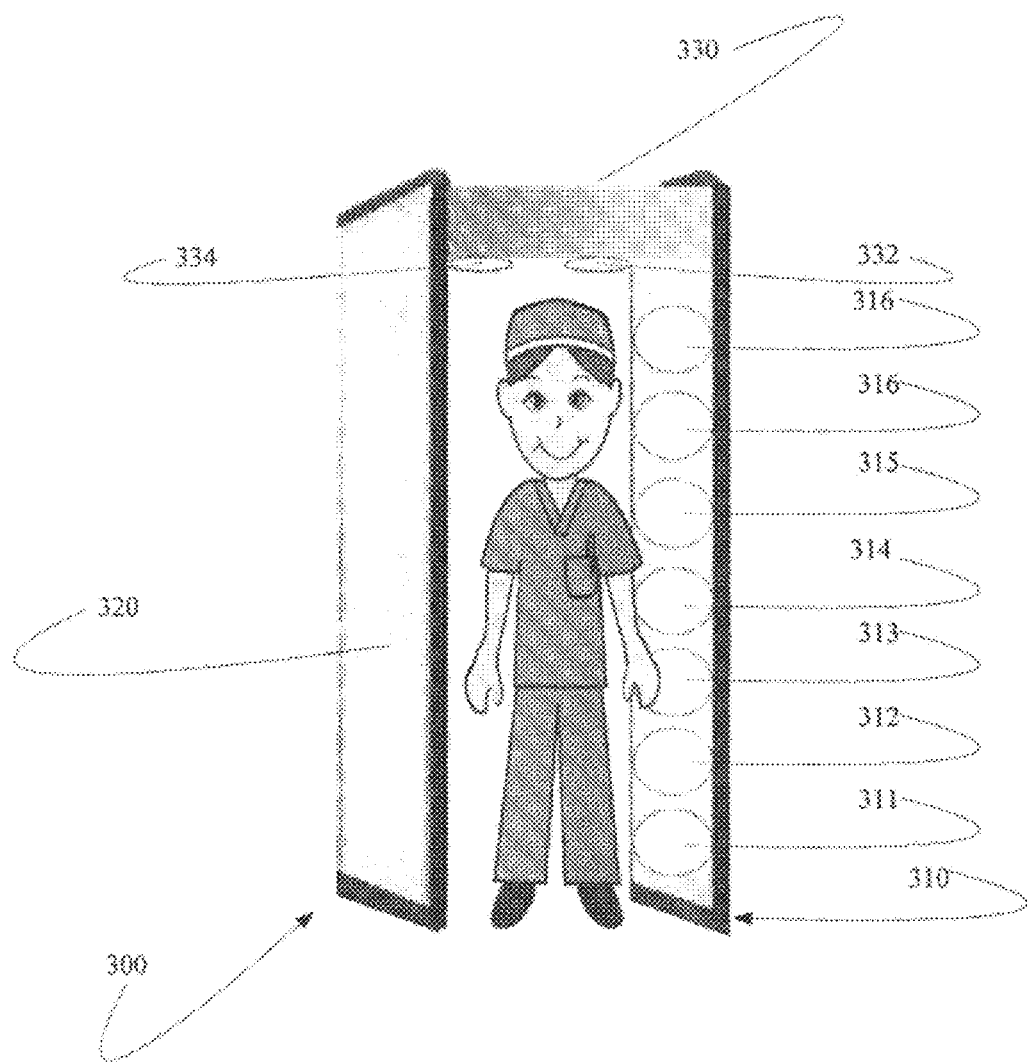
FIG. 3 illustrates Applicants' sterilizing station 300.

Referring now to FIG. 3, Applicants' sterilizing station 300 comprises a "walk through" assembly having two opposing sides 310 and 320 which are joined by top 330. In the illustrated embodiment of FIG. 3, side 310 comprises a plurality of UV light emitters 311, 312, 313, 314, 315, 316, and 317, where that plurality of UV emitters face the interior, i.e. walking space portion, of sterilizing station 300. In other embodiments, Applicants' sterilizing station 300 comprises fewer than seven (7) UV emitters per side. In still other embodiments, Applicants' sterilizing station comprises more than seven (7) UV emitters per side.

Side 320 is similarly formed to include a plurality of UV emitters, where each of those UV emitters face the interior, i.e. walking space portion, of sterilizing station 300. The plurality of UV emitters disposed on the interior portion of side 310 have a facing relationship with the plurality of UV emitters disposed on the interior portion of side 320.

Further in the illustrated embodiment of FIG. 3, top portion 330 comprises a plurality of UV emitters, i.e. UV emitters 332 and 334, where those UV emitters face downwardly. In other embodiments, top portion 330 comprises more than two (2) UV emitters.

The illustrated embodiment of FIG. 3 shows a medical practitioner walking through sterilizing station 300. The medical practitioner is wearing a scrub suit, the various pieces of which have been coated on the exterior surface with Applicants' coating composition. As the practitioner walks through sterilizing station 300, the plurality of UV emitters disposed on sides 310 and 320, and the plurality of UV emitters disposed on top 330, are energized thereby maximizing the photocatalytic effect of Applicants' coating. Enhancing the photocatalytic activity of the coating maximizes the production of high energy, atomic oxygen species at the surface of scrub suit pieces, thereby, effectively sterilizing the exterior surfaces of all scrub suit articles.

While the preferred embodiments of the present invention have been illustrated in detail, it should be apparent that modifications and adaptations to those embodiments may occur to one skilled in the art without departing from the scope of the present invention as set forth herein.

We claim:

1. A polymeric material formed by reacting an aminopolyol having a structure:

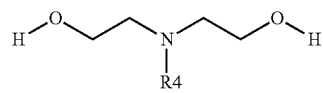

wherein R4 is selected from the group consisting of —H and —CH$_2$—CH$_2$—OH;
and an organosilane, wherein said organosilane has a structure:

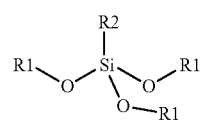

1 wherein R1 is selected from the group consisting of —H, —CH$_3$ and —CH$_2$—CH$_3$ and R2 is selected from the group consisting of alkyl, alkyl with a chlorine moiety, alkyl with an amino moiety, and alkyl with a quaternary ammonium group, and further comprising a mixture of Peroxotitanium acid solution and Peroxo-modified anatase sol.

2. The polymeric material of claim 1, comprising a cross-linked polymer having a structure:

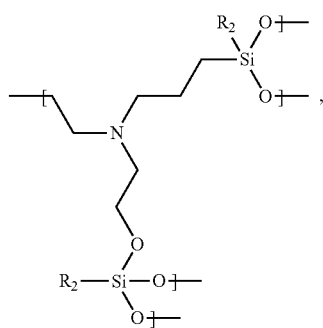

wherein R2 is selected from the group consisting of alkyl, alkyl with a chlorine moiety, alkyl with an amino moiety, and alkyl with a quaternary ammonium group.

3. The polymeric material of claim 1, further comprising titanium dioxide.

4. The polymeric material of claim 1, wherein said organosilane comprises 3-aminopropylsilanetriol.

5. The polymeric material of claim 1, wherein said organosilane comprises at least one of 3-chloropropylsilanetriol or 3-octadecylaminodimethyltrihydroxysilylpropyl ammonium chloride.

6. The polymeric material of claim 1, further comprising a silsesquioxane having a structure:

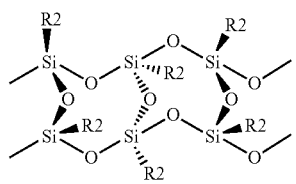

wherein R2 is selected from the group consisting of alkyl, alkyl with a chlorine moiety, alkyl with an amino moiety, and alkyl with a quaternary ammonium group.

7. A polymeric material formed by reacting an aminopolyol having a structure:

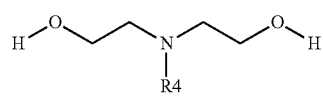

wherein R4 is selected from the group consisting of —H and —CH$_2$—CH$_2$—OH, and an organosilane, wherein said organosilane has a structure:

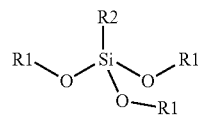

wherein R1 is selected from the group consisting of —H, —CH$_3$ and —CH$_2$—CH$_3$ and R2 is selected from the group consisting of alkyl, alkyl with a chlorine moiety, alkyl with an amino moiety, and alkyl with a quaternary ammonium group, and further comprising a silsesquioxane having a structure:

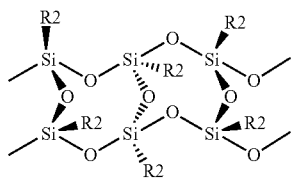

wherein R2 of the silsesquioxane is selected from the group consisting of alkyl, alkyl with a chlorine moiety, alkyl with an amino moiety, and alkyl with a quaternary ammonium group.

8. The polymeric material of claim 7, further comprising a mixture of Peroxotitanium acid solution and Peroxo-modified anatase sol.

9. The polymeric material of claim 8, further comprising titanium dioxide.

10. The polymeric material of claim 7, wherein said organosilane comprises at least one of 3-aminopropylsilanetriol, 3-chloropropylsilanetriol, or 3-octadecylaminodimethyltrihydroxysilylpropyl ammonium chloride.

11. A polymeric material formed by reacting an aminopolyol having a structure:

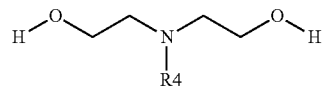

wherein R4 is selected from the group consisting of —H and —CH—CH$_2$—OH;

and an organosilane, wherein said organosilane has a structure:

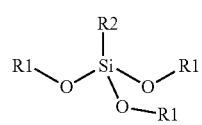

wherein R1 is selected from the group consisting of —H, —CH$_3$ and —CH$_2$—CH$_3$ and R2 is selected from the group consisting of alkyl, alkyl with a chlorine moiety, alkyl with an amino moiety, and alkyl with a quaternary ammonium group, wherein said organosilane comprises at least one of 3-chloropropylsilanetriol or 3-octadecylaminodimethyltrihydroxysilylpropyl ammonium chloride.

12. The polymeric material of claim 11, further comprising a mixture of Peroxotitanium acid solution and Peroxo-modified anatase sol.

13. The polymeric material of claim 12, further comprising titanium dioxide.

14. The polymeric material of claim 11, further comprising a silsesquioxane having a structure:

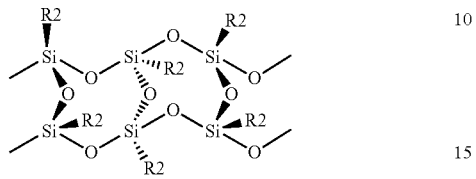

wherein R2 of the silsesquioxane is selected from the group consisting of alkyl, alkyl with a chlorine moiety, alkyl with an amino moiety, and alkyl with a quaternary ammonium group.

* * * * *